Aug. 22, 1939.   W. K. ROSE   2,170,787
LATERAL CONTROL MEANS FOR AIRPLANES
Filed May 21, 1938   6 Sheets-Sheet 3
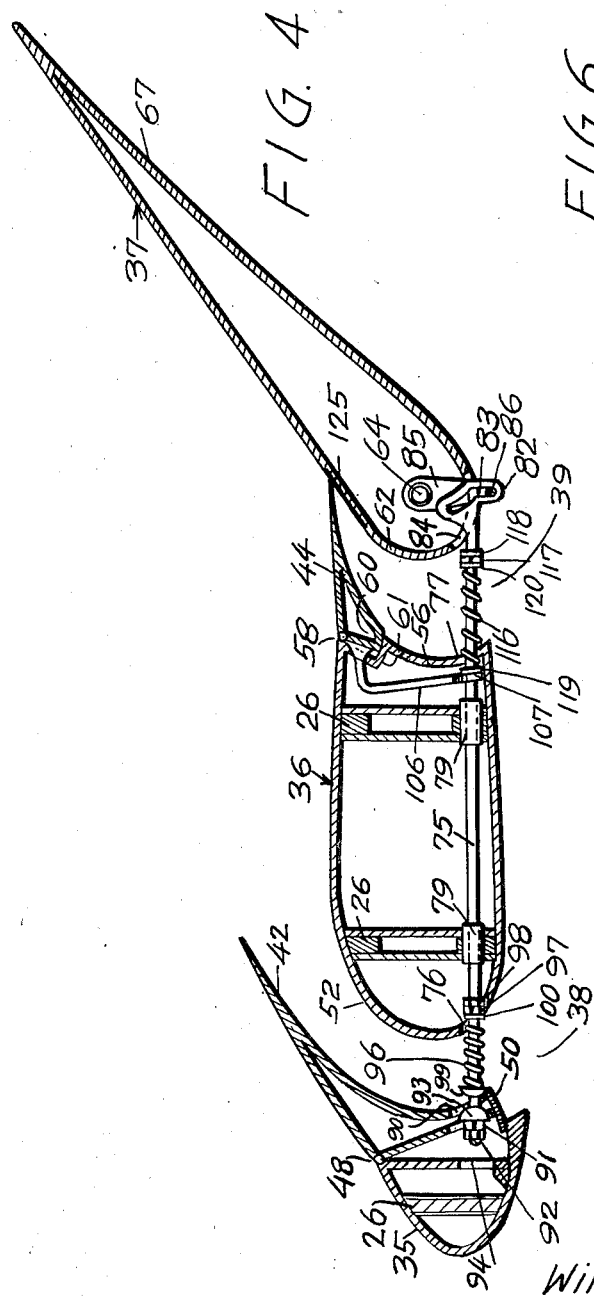
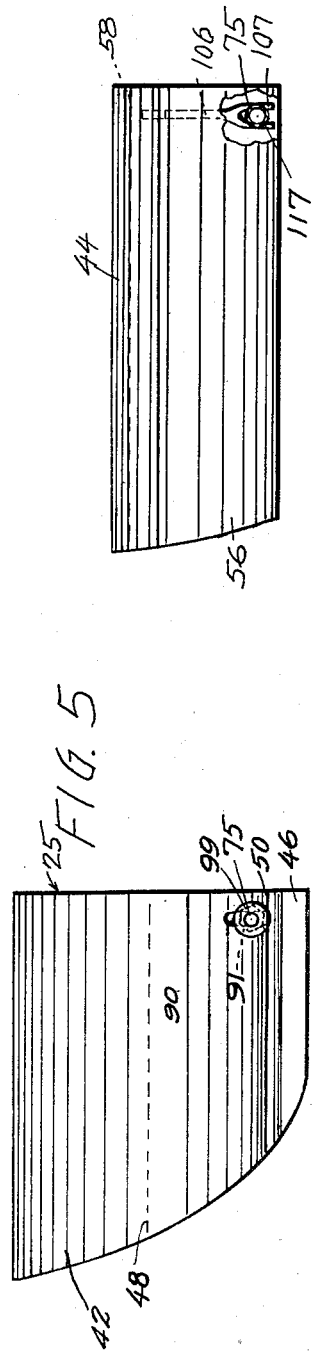
INVENTOR.
William K. Rose
BY
ATTORNEYS

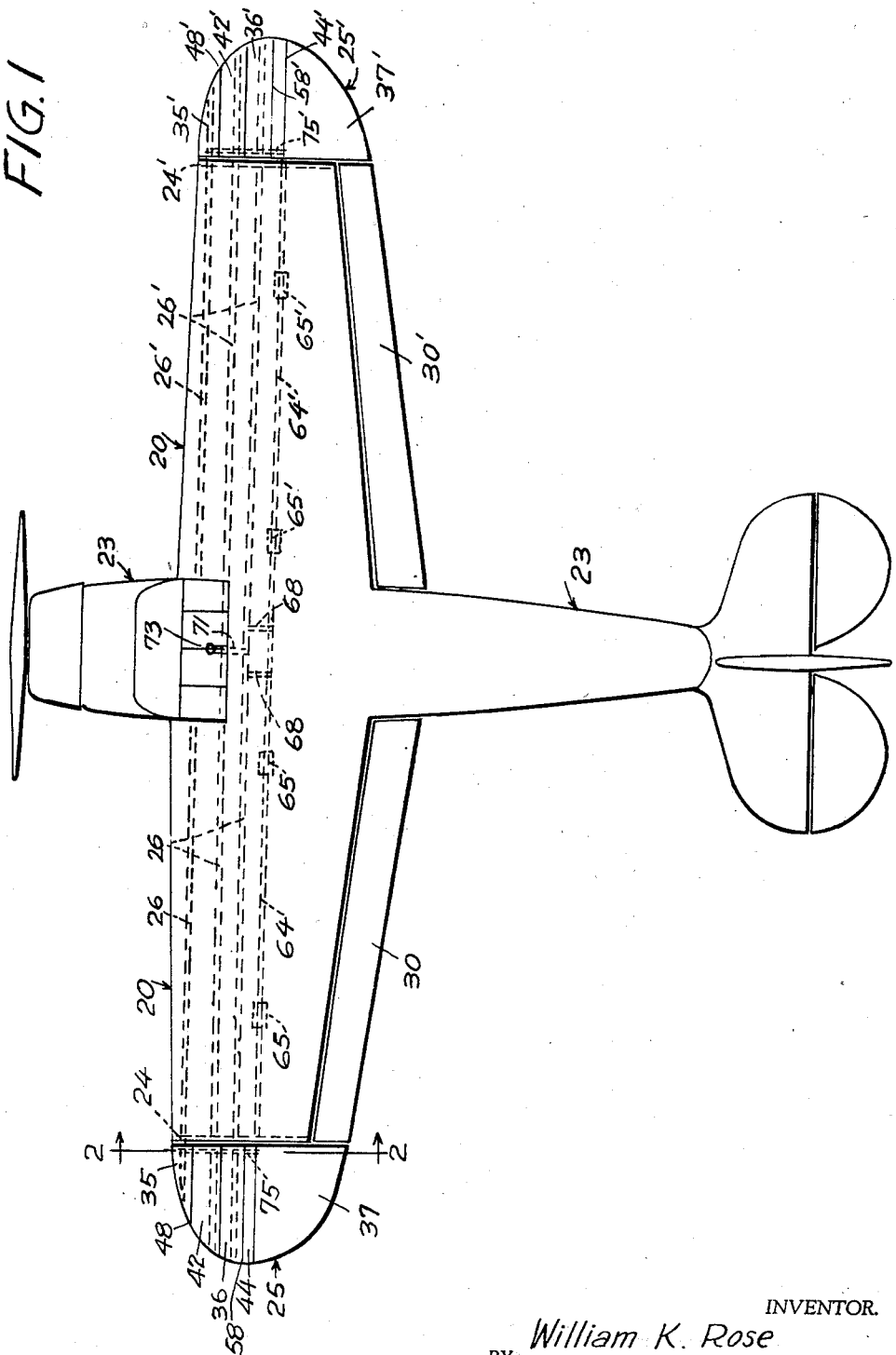

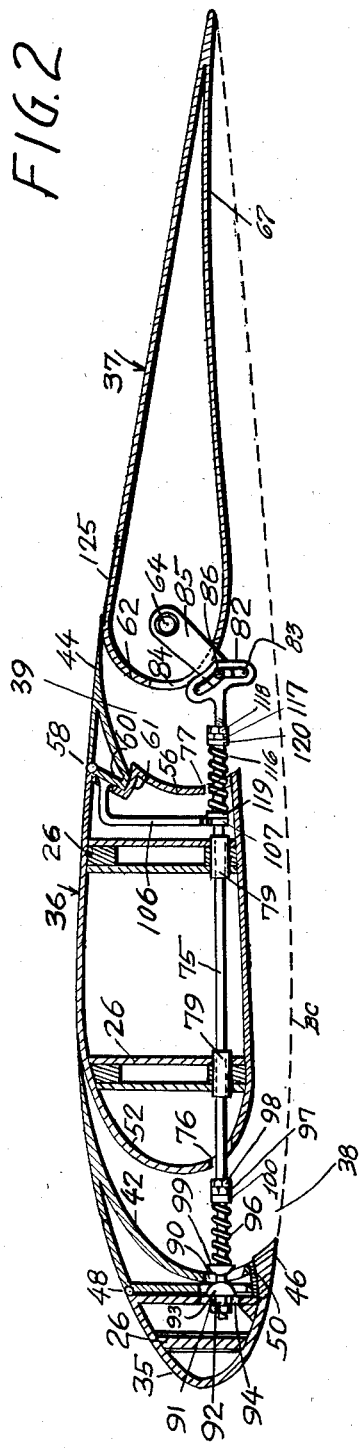
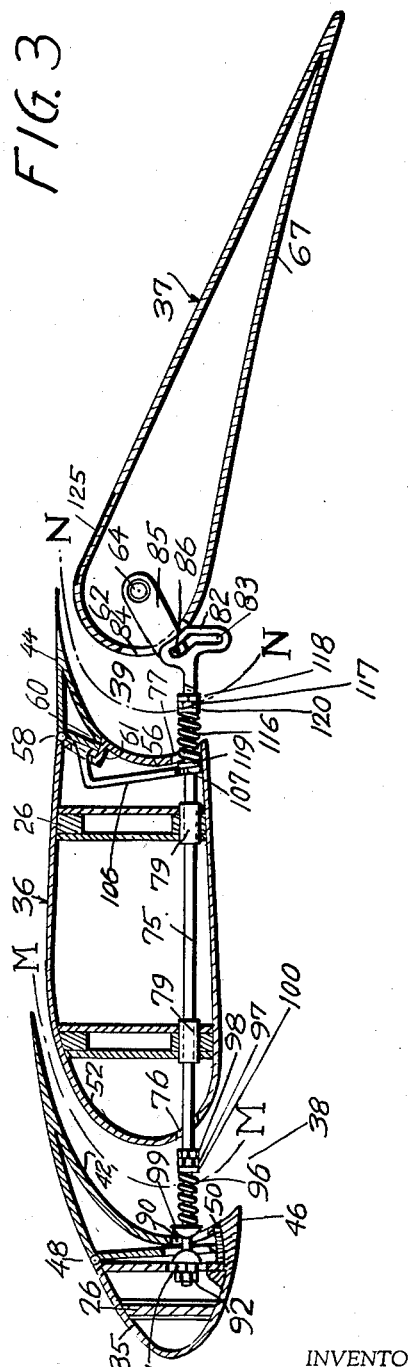

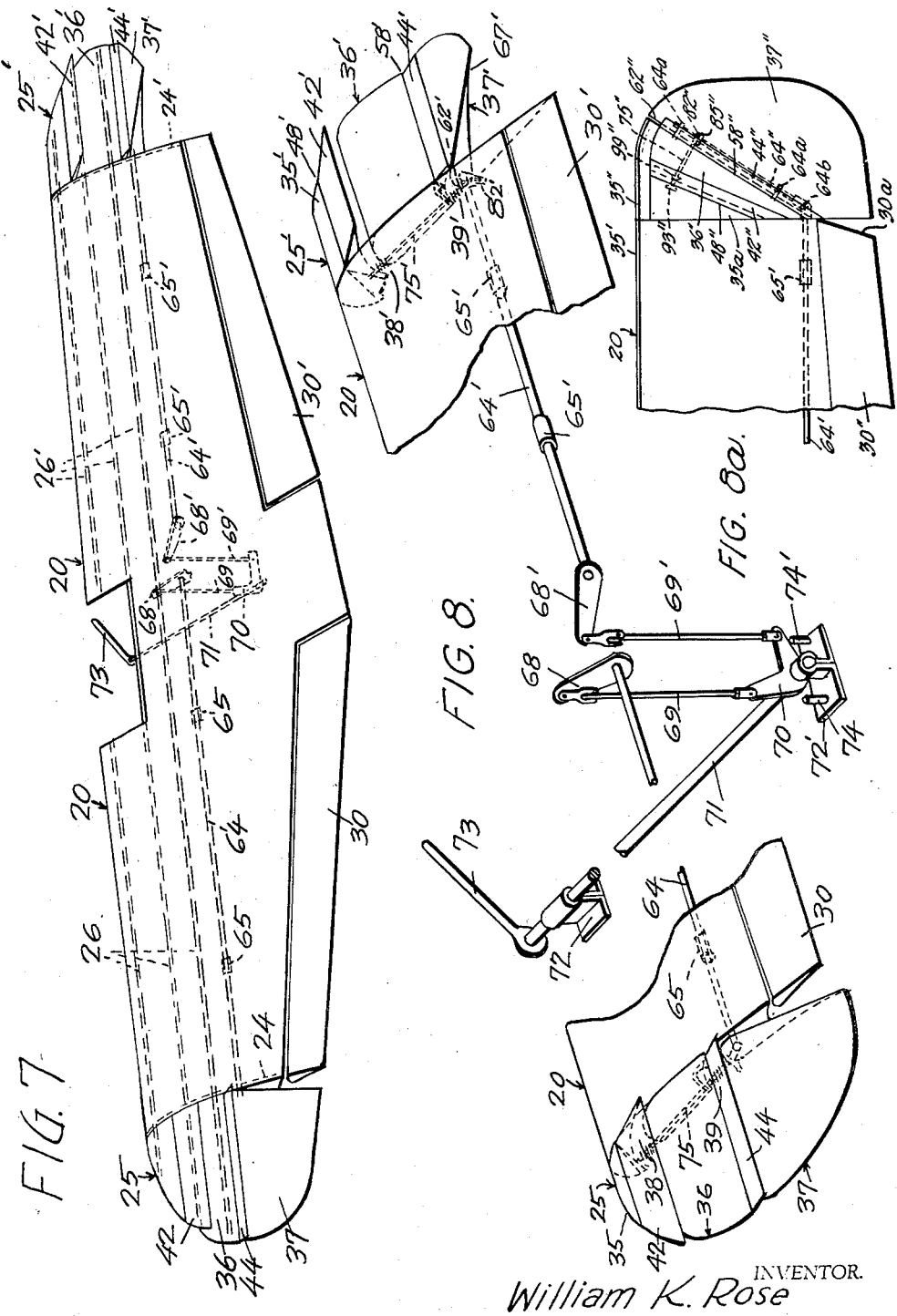

Patented Aug. 22, 1939

2,170,787

UNITED STATES PATENT OFFICE 2,170,787

LATERAL CONTROL MEANS FOR AIRPLANES

William K. Rose, New York, N. Y.

Application May 21, 1938, Serial No. 209,220

27 Claims. (Cl. 244—42)

This invention relates to airplanes and more particularly to means for the lateral control of airplanes about their longitudinal axes.

The primary object of the invention is means by which the lateral control of the airplane is assured beyond the stalling angle of the airfoil or airfoils which support the airplane in flight, which means are also effective at and below the stalling angle of the airfoil or airfoils.

Another object of the invention is to reduce the span area of the airfoil or airfoils required by the movable parts of the said lateral control means to the minimum and thus to provide for much longer flaps than are now possible with the ailerons commonly employed for lateral control.

Other objects of the invention will be apparent as this specification proceeds.

In its broadest aspect the invention embodies means provided at or near the extreme ends of an airfoil which cooperate with the airfoil itself in controlling the airflow about the airfoil and about and through the parts at the ends thereof in such a way that the rolling force overcomes the effect of the adverse yawing force not only for angles of attack at and below the stalling angle but also beyond the stalling angle to such extent that lateral control is maintained for all angles of attack likely to be encountered in flight.

*Elongated wing tips.*—The means above recited as provided at or near the extreme ends of the airfoil are herein termed "elongated wing tips", this term being adopted from my United States Letters Patent No. 2,125,738 which issued on my copending application Ser. No. 116,246, filed December 17, 1936, of which this application is a continuation in part. Such wing tips may form a part of the airfoil structure as indicated in said Letters Patent No. 2,125,738 or may be of separate structure, for example, as specifically illustrated herein. The term is not intended to exclude wing portions which may extend outwardly beyond the so-called "elongated wing tips", whether for endwise protection, for possible increase of the effectiveness of the elongated wing tips, or for other reasons. As will be apparent as this specification progresses it is, however, of advantage to have the power arms of the leverage system created by the elongated wing tips of substantial length and to that end I have herein illustrated the said wing tips at the extreme ends of the airfoil.

The term "elongated" is obviously a term by which the wing tips of the said United States Letters Patent No. 2,125,738 and of the present application are compared in spanwise dimension with the wing tips now commonly employed which extend but a few inches beyond the end of the air foil in closing its ends.

This application is also a continuation in part of my co-pending application Ser. No. 121,101, filed January 18, 1937 (United States Letters Patent No. 2,167,601), and in many ways may be considered an adaptation of the airfoil construction therein set forth, to means for the lateral control of planes.

In the elongated wing tips of this invention there is embodied a plurality of curved passageways by which the airflow is modified and utilized in the lateral control of the airplane. To the rear of such passageways in each wing tip there is mounted a movable aileron which also modifies and utilizes the airflow in said lateral control, being raised to decrease lift and lowered to increase lift as in ordinary practice. The passageways and the aileron cooperate in the modification and utilization of the airflow in the lateral control of the airplane herein provided.

I have herein illustrated the passageways as being provided with means for opening and closing the same at the top and have shown means for controlling the said opening. When the aileron in one wing tip is raised to decrease the lift thereof, the opening and closing of the passageways in said wing tip is so controlled as further to decrease the lift thereof, particularly in extreme positions of the aileron. When the aileron in one wing tip is lowered to increase the lift thereof, the means for controlling the opening and closing of the passageways in that wing tip are effective to assure such opening of the passageways as further to increase the lift of that wing tip, particularly in extreme positions of the aileron.

The passageways in the last instance are so proportioned and have the extent of their maximum opening so limited as to come within the fundamental characteristics of the passageways of my U. S. Letters Patent No. 2,077,070. In said Letters Patent by reason of the contour and formation of the passageways on the flow of pressure air therethrough a force is developed within the airfoil itself which, dependent on the direction of curvature of the said passageways either increases or decreases the lift of the airfoil. In this action the passageways operate in a manner similar to the rotor "buckets" or passages of steam turbines and because of this similarity of action I refer to said passageways as "passageways of the turbine type."

A *"Passageway of the turbine type"* as that term is herein employed, has the following essential characteristics: (1) The passageway is curved and its cross-section gradually diminishes from inlet to outlet; (2) there is no appreciable straight line path for air from inlet to outlet; (3) the mean cross-sectional line of the passageway gradually flattens from bottom to top and comprises the segment of a spiral; and (4) the passageway has its inlet at the bottom of the elongated wing tip forward of its outlet on the top of the wing tip and its curvature is upward from the bottom.

It should be particularly noted that the fourth characteristic just recited is not an essential of passageways of the turbine type broadly set forth and claimed in said U. S. Letters Patent No. 2,077,070. It is included in the foregoing definition for purposes of convenience and ready reference because the passageways herein set forth when characterized by the first three essentials just above enumerated are employed for increasing the lift of the elongated wing tip and for directing the air projected from their outlets backward over the wing tip rather than toward the front thereof.

Reference now being had to the form of lateral control means herein specifically described and shown in the drawings, it must be understood that the description and drawings are for illustrative purposes and are not to be construed as limitative upon the scope of this invention.

In the drawings:

Figure 1 is a top plan view of a conventional airplane provided with lateral control means embodying the invention herewith;

Fig. 2 is a sectional view of the control means shown in Fig. 1 on the line 2—2 thereof, being principally in outline and illustrating the control means (in full lines) in neutral position;

Fig. 3 is a sectional view corresponding with Fig. 2, illustrating the control means (in full lines) in position for raising the side of the airplane in effecting maximum roll;

Fig. 4 is a sectional view corresponding with Fig. 2, illustrating the control means (in full lines) in position for lowering the side of the airplane in effecting maximum roll;

Fig. 5 is a rear elevation of the forward vane or blade of the forward passageway and associated parts of the wing tip in the position shown in Fig. 4;

Fig. 6 is a rear elevation of the forward vane or blade of the rearward passageway and associated parts of the wing tip in the position shown in Fig. 4;

Fig. 7 is an isometric view of the airfoil, wing tips and control means of Fig. 1, illustrating the wing tip parts and control means in position for maximum effect in turning the airplane to the right (positive roll);

Fig. 8 is a schematic view (broken away) of mechanism suitable for the manual control of the passageways and ailerons forming a part of this invention;

Fig. 8a is a schematic view of the airfoil of Figs. 1 to 8, inclusive, broken away and having attached at the right a wing tip in which the passageways are located substantially chordwise of the airfoil, and to this extent being a modification of the wing tips of Figs. 1 to 8, inclusive.

Figure 11:
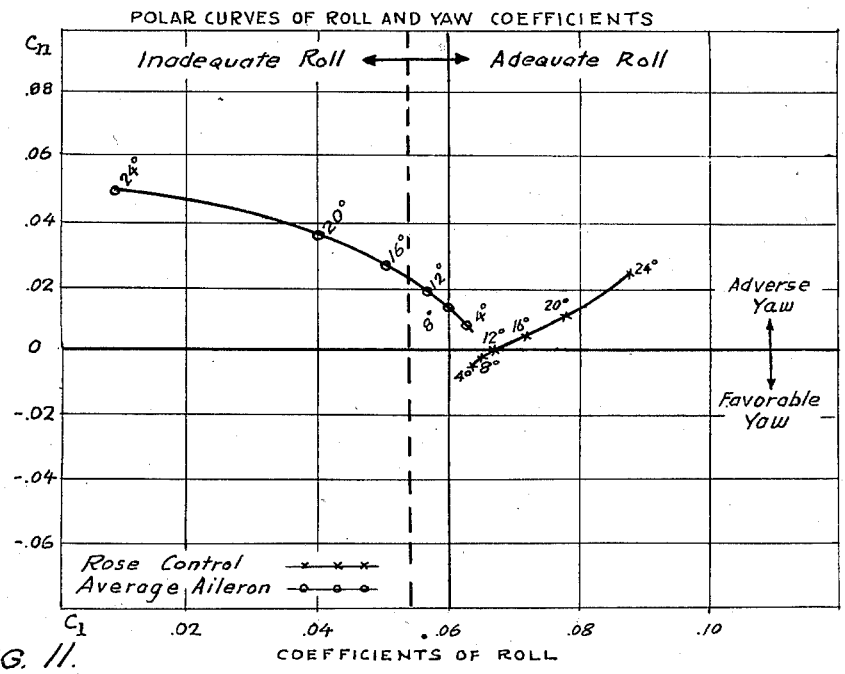
Figure 12:
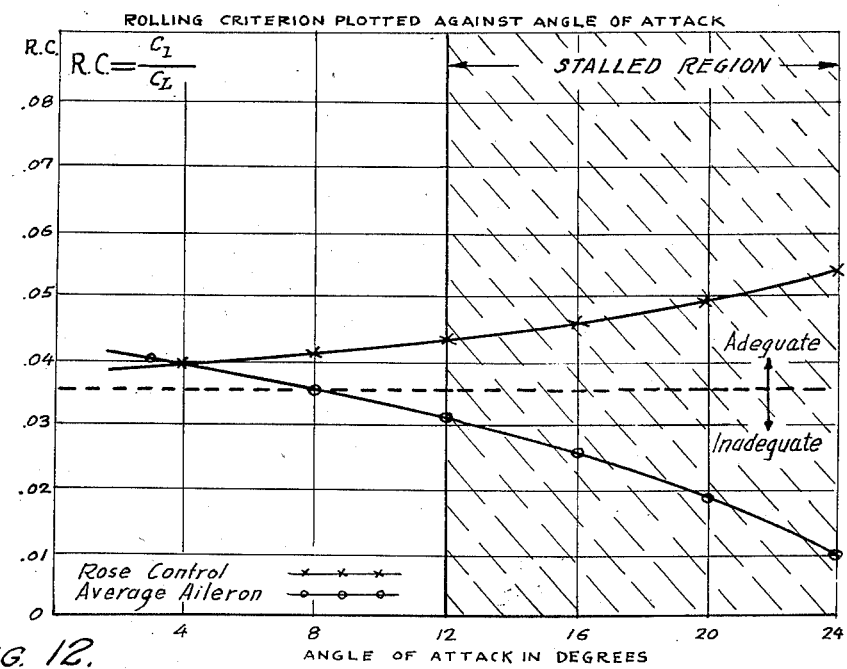

Fig. 11 is a chart showing polar curves of rolling and yawing coefficients of an airfoil equipped with control means made in accordance with this invention and of a similar airfoil equipped with an average aileron of equivalent area, the angle of attack changes being indicated in degrees on the said curves; and Fig. 12 is a chart showing the rolling criterion curves of an airfoil equipped with control means made in accordance with this invention and of a similar airfoil equipped with an average aileron of equivalent area, the curves being plotted against angle of attack.

The curves of Figs. 9 to 12 inclusive, are made from and to accord with data obtained in the comparative testing of suitable models in the same open throat wind tunnel and under the same conditions. In these wind tunnel tests the airfoils equipped with elongated wing tips embodying the invention hereof were identical with the airfoils equipped with the average aileron, and the average aileron employed was of area equivalent to the aileron embodying the invention of this application. In each instance the control mechanism was set for maximum effect.

The term "equivalent area" in the foregoing is to be understood as referring to an area of the average aileron which produced with maximum deflection at low angles of attack (specifically at 4° angle of attack in the tests herein recorded) initial roll values equal to the roll values obtained by the lateral control means hereof at the same low angles of attack. The actual area of the average aileron employed in the tests for comparison with the lateral control means hereof was far in excess of the area of the aileron of said lateral control means.

CONSTRUCTION

*General features*

Reference being had to the form of airfoil and wing tip illustrated in Figs. 1 to 8 herein, it will be seen that the airfoil 20 is illustrated as comprising a single span from wing tip to wing tip extending over and mounted on a fuselage 23 which may be of any desired type suitable for the mounting thereon of an airfoil of this character. It will be obvious as this description progresses that the single span type of airfoil chosen for illustration is not essential to the invention which is equally applicable to airfoil structures which are dual in structure, one wing on one side of the fuselage and the other wing on the other side, and both suitably mounted on the fuselage.

Furthermore as a matter of convenience the airfoil is illustrated herein as an airfoil of the solid type. This is not at all essential to the invention hereof which is equally applicable to airfoils provided with passageways such for example as is set forth in the said U. S. Letters Patent No. 2,077,070 and said co-pending application Ser. No. 121,101 and adaptations thereof.

The ends of the airfoil structure joining the wing tips are herein illustrated as closed by solid ribs 24, 24'.

At each end of the airfoil is located an elongated wing tip 25 at the left end of the airfoil, 25' at the right end thereof, viewing the airplane from the top toward the front as in Figs. 1 and 8. These elongated wing tips 25, 25' are suitably mounted on their respective ends of the airfoil 20, as for example, on and by means of suitable fittings or prolongations of the conventional airfoil spars 26 and 26' of the airfoil 20, (when embodying spars) which conveniently pass into or through the wing tips. The upper profile curve of the wing tips conforms generally with the upper profile curve of the airfoil. Whether or not the lower surface of the wing tips is in conformity with the lower surface of the airfoil depends upon the type of airfoil employed, whether solid or provided with passageways, and a number of factors incident thereto, as will appear as this description progresses.

As illustrated, the wing tips 25, 25' are in line with the longitudinal axis of the airfoil. The showing in this respect is not intended as limitative, the same conditions determining the desirability of straight line or angular position of the wing tips respecting the airfoil apply in this case as in the said United States Letters Patent No. 2,125,738, and the wing tips hereof may be mounted on an angle to the airfoil extending downwardly therefrom up to a maximum of 90 degrees from the plane of the main supporting surface of the airfoil.

The trailing edge of the airfoil 20 is formed by flaps 30, 30' which extend laterally from approximately the rearward mounting points of the airfoil on the fuselage to the ends of the airfoil. They are suitably hinged to the rearward portion of the airfoil as in common practice. Conventional means for manually operating the flaps (when used) are intended to be employed. The hinging of the flaps and their operating means being well known in the art are not herein illustrated.

As illustrated, the flaps 30, 30' are of conventional construction conforming in both their upper and lower surfaces with a profile of the airfoil. This is not essential to this invention which is entirely independent of the type of flaps which are employed on the airfoil in connection with which the invention is utilized. A great variety of flaps is well known in the art and any one of these may be used on the airfoil employed. With airfoils embodying the passageways of the said U. S. Letters Patent No. 2,077,070, and said co-pending application Ser. No. 121,101 (United States Letters Patent No. 2,167,601) and adaptations thereof, the flap shown in the said application is preferable; but this is a matter of airfoil structure independent of the present invention, and while the present invention affords the great advantage in making possible a flap extending to the lateral extremities of the airfoil no flap at all may be used if the airfoil designer so prefers.

*Details of elongated wing tip*

Aside from the reversal of wing tip parts and their form necessitated by the fact that one wing tip is on the left and the other on the right end of the airfoil, the wing tips are of identical construction, and description of that construction can, therefore, be limited to one wing tip, that on the left of the fuselage being selected for this purpose. The same reference numerals will be employed on both wing tips except that a prime will be added to the numerals on the right wing tip.

The wing tip 25 as shown comprises a stationary or fixed nosepiece 35; a stationary or fixed body portion 36; a manually movable aileron 37; a plurality of upwardly curved passageways 38, 39 extending through the wing tip from the lower surface to the upper surface thereof with inlet ports at the bottom of the wing tip and outlet ports at the top thereof, the inlet port of each passageway being to the front of the outlet port thereof; and means 42, 44 for opening and closing said passageways. Two of such passageways are illustrated, the forward passageway 38 and the rearward passageway 39, the forward passageway being immediately at the rear of the nosepiece 35 and the rearward passageway being immediately at the front of the aileron 37. One or more additional passageways of the character just described may if desired be provided in the body portion 36 of the wing tip between the forward passageway 38 and the rearward passageway 39. Subsequent data as to performance and operation is based on tests of wing tips constructed in accordance herewith which embodied only the forward and rearward passageways as herein specifically shown. For this reason and for simplicity of drawings and description only the two said passageways are illustrated.

The nosepiece 35 of desired forward contour is constructed in accordance with standard practice and as illustrated is fixedly mounted against the end of the airfoil 20 on the spar 26 extending through the nosepiece of the airfoil. Details of mounting are well within the skill of a mechanic and are not herein shown. On the bottom and to the rear the nosepiece terminates in an extension 46 which comprises a part of the nosepiece and is so shaped on the bottom that its profile continues the lower camber curve of the nosepiece at the front thereof, as shown more particularly in Figs. 2, 3, and 4. At the rear the extension lies below the lower surface of the body portion 36 of the wing tip and the lower surface of the aileron 37 when the latter is in normal or neutral position for straight-away flight. This is graphically illustrated by reference to the dotted line BC on Fig. 2 drawn to continue the lower camber curve of the nosepiece to the trailing edge of the aileron as the theoretical bottom curve for a wing of semi-symmetrical or convex bottom camber. This downwardly and rearwardly extending portion of the nosepiece tends to create a forward eddy current beneath the body portion 36 of the wing tip enhancing the effectiveness of the forward passageway 38 when open, as set forth in detail in my said application Ser. No. 121,101 (United States Letters Patent No. 2,167,601).

The front wall of the forward passageway 38 comprises a concavely curved vane or blade 42 which is attached to the top of the nosepiece 35 at the rear thereof by means of a suitable pivot 48 about which it has limited rotation. The rearward edge of this vane or blade 42 in neutral position, as illustrated in Fig. 2, is held to the top of the body portion 36 of the wing tip preferably just to the rear of the maximum ordinate of the top camber curve thereof and closes the forward passageway 38 in this position, as set forth more fully in my said application Ser. No. 121,101 (United States Letters Patent No. 2 167,601).

The vane or blade 42 terminates at the bottom in a forwardly extending plate 50 having a curvature struck from the pivot 48 as a center. This plate 50 makes a sliding contact with the upper edge of the rearward extension 46 of the nosepiece and serves with the solid end rib 24 to block an objectional inflow of air from the bottom and side of the wing tip into the nosepiece when the bottom edge of the vane or blade 42 is rotated rearwardly out of alignment with the rearward extension 46 of the nosepiece—see Fig. 4.

In the closed position of the forward passageway the rearwardly extending portion 46 of the nosepiece projects slightly beyond the lower end of the vane or blade 42. In the position of the said vane or blade, illustrated in Fig. 3, the said extension 46 is at the rear flush with the forward vane or blade. The extension has its rearward surface curved to conform with the curvature of the rear surface of the vane or blade 42, and to serve as an unbroken continuation of said curvature when the extension and vane or blade are in alignment. It may, therefore, be considered as a lower extension of the said vane or blade when said alignment obtains.

The body portion 36 of the wing tip is constructed in accordance with standard practice and as illustrated is fixedly mounted against the end of the airfoil 20 on the spars 26 extending through the body of the airfoil. Details of mounting are well within the skill of a mechanic and are not herein shown.

The forward end of the body portion comprises the rearward vane or blade 52 of the forward passageway 38 and is curved from the top (where the forward vane or blade 42 contacts with the body portion in closed position of the passageway) in a convex curve which sweeps around the lower forward edge of the body portion rounding off the otherwise sharp corner thereof.

The concave surface of the forward vane or blade 42 and the convex surface of the rearward vane or blade 52 are so formed, constructed and arranged that on initial opening of the passageway the cross-section of the passageway gradually diminishes from bottom to top, there is no appreciable straight line passage for air from bottom to top between the two vanes or blades, and the mean line of curvature of the pasageway gradually flattens from bottom to top and, to the extent specified in said U. S. Letters Patent No. 2,077,070, comprises the segment of a spiral. This relation of curved surfaces continues on the further but limited opening of the passageway, and so long as it continues the passageway is of the turbine type, hereinabove defined, resulting on the passage of pressure air therethrough from the bottom in increased lift of the wing tip. Furthermore the formation, construction and arrangement of the said forward vane or blade 42 and rearward vane or blade 52 are such that during the maintenance of this relation of curved surfaces the stream of air going through the passageway is deflected at substantially right angles to its plane of entrance and is discharged from the passageway along the upper surface of the body portion of the wing tip substantially parallel with the lower surface or mean camber line thereof. This results in lowering the drag of the wing tip. These two attributes of the passageway and the characteristic curvatures of the vanes or blades are fully set forth in said U. S. Letters Patent No. 2,077,070 to which reference is made without further description herein.

This relation of vane or blade curvatures on the open position of the passageway is illustrated in Fig. 3 which shows the turbine type of passageway with a margin of safety for slight further opening without departure from the characteristic attributes of increased lift and lowered drag. Note the dot and dash spiral line M—M. While not strictly true because of this margin of safety, Fig. 3 may conveniently be said to show the position of maximum lift and minimum drag of the passageway.

The curvatures of the vanes or blades 42, 52 and the formation, construction and arrangement thereof above set forth are such, that on continued opening of the forward passageway 38 beyond the position of maximum lift and minimum drag this characteristic of diminishing cross-section of the passageway is lost. A free path for air through the passageway is provided and the cross-section of the passageway instead of diminishing from bottom to top increases. When this later relation of the vanes or blades 42, 52 exists the lift characteristic of the passageway is completely destroyed and the lift of the wing tip is decreased, and, the forward vane or blade being substantially raised above the normal profile of the wing tip, the drag is increased. With the operating mechanism herein shown and later to be described, set as indicated, the extreme opening of the passageway is shown in Fig. 4, which may conveniently be said to show the position of minimum lift and maximum drag of the pasageway.

The forward vane or blade of the rearward passageway 39 is composed of a lower fixed or stationary section 56 and an upper movable section 44. The lower section 56 is formed by the rear of the body portion 36 of the wing tip and extends from the bottom thereof upwardly in concave curvature a suitable distance as desired, for example, as shown in Figs. 2, 3 and 4. The upper section 44 is attached to the back of the body portion at the top thereof by means of a suitable pivot 58 about which it has limited rotation. The rearward surface of the upper section 44 is concavely curved, this curvature being a continuation of the curvature of the lower section 56 when the upper section 44 is rotated so that its lower edge registers with the upper edge of the lower section 56, as shown in Fig. 3. With the operating mechanism herein shown and later to be described, set as indicated, this position of alignment is attained on maximum opening of the rearward passageway.

The lower edge of the vane or blade section 44 terminates in a forwardly extending portion 60 having a curvature struck from the pivot 58 as a center. The upper edge of the vane or blade section 56 terminates in a forwardly extending portion 61 having a curvature struck from the pivot 58 as a center. These forwardly extending portions 60 and 61 have a sliding contact, one with the other, and, with the solid end rib 24 serve to block objectional inflow of air from the passageway into the body portion of the wing tip when the faces of the vane or blade sections 44 and 56 are out of alignment, for example, as shown in Figs. 2 and 4.

The forward end of the aileron 37 comprises the rearward vane or blade 62 of the rearward passageway 39. The aileron itself is constructed in accordance with standard practice and is fixedly mounted on a shaft 64 which as shown extends spanwise into the airfoil 20 where it is rotatedly mounted in journal boxes 65, 65' against endwise movement. Details of construction and mounting are well within the skill of a mechanic and are not herein shown. The rearward vane or blade 62 is formed with a convex curve extending completely around the forward edge of the aileron for an arc of substantially 180 degrees.

In maximum open position of the passageway 39 above set forth, Fig. 3, with the upper section 44 raised and the aileron 37 lowered, the concave surface of the forward vane or blade 44, 56 and the convex surface of the rearward vane or blade 62 are so formed, constructed and arranged that the cross-section of the passageway 39 gradually diminishes from bottom to top, there is no appreciable straight line path for air from bottom to top between the two vanes and the mean line of curvature of the passageway gradually flattens from bottom to top and, to the extent specified in said U. S. Letters Patent No. 2,077,070, comprises the segment of a spiral indicated by the dot and dash line N—N, Fig. 3. The passageway is, therefore, of the turbine type, hereinabove defined, in which on the passage of pressure air therethrough from the bottom a force is developed increasing the lift of the wing tip. Furthermore in the said maximum open position of the passageway the formation, construction and arrangement of the forward and rearward blades are such that the stream of air going through the passageway is deflected at substantially right angles from its plane of entrance and is discharged from the passageway along the upper surface of the aileron substantially parallel with the lower surface or mean camber line of the body portion 36 of the wing tip. This results in lowering the drag of the wing tip. These two characteristics of the rearward passageway 39 in maximum open position are substantially true for all positions from maximum open position to closed position. The result thereof is an increase in lift and a decrease in drag for all open positions of the passageway. These two attributes of the passageway and the characteristic curvatures of the vanes or blades are fully set forth in said U. S. Letters Patent No. 2,077,070 to which reference is made without further description hereof.

Contrary to the continued opening of the forward passageway 38 beyond the position of maximum lift and minimum drag, Fig. 3, to assume the position of minimum lift and maximum drag, Fig. 4, the rearward passageway 39 is maintained closed when minimum lift and maximum drag characteristics are desired for the wing tip. This closure of the rearward passageway 39 is the result of the discovery that when the passageway is opened and the aileron raised the turbulence above the wing tip and along the upper surface of the aileron which is effected by the opening of the forward passageway beyond its position of maximum lift and minimum drag and by the aileron in its upper position is greatly diminished, particularly along the upper surface of the aileron. It has been shown by the tests heretofore referred to, that with the rearward passageway opened in the upper position of the aileron a laminar flow is set up along the upper surface of the aileron which combined with the lowered pressure beneath the aileron in raised position operates not only to reduce the drag but gives to the aileron a lift, both of which conditions are contrary to the effect sought on raising the aileron from neutral position.

With the operating mechanism herein shown and later to be described, this closure is effected by a sliding contact between the extreme rearward edge of the vane or blade section 44 and its cooperating vane or blade 62 and the top of the aileron 37. The contrasting positions of the forward and rearward passageways for minimum lift and maximum drag effect on the wing tip are clearly shown in Fig. 4.

As heretofore stated the upper profile of the wing tip (of which the aileron 37 is a part) conforms generally with the upper profile of the airfoil 20, but the lower profile of the wing tip may or may not conform to the lower profile of the airfoil. The lower profile of the wing tip illustrated is generally in conformation with that of the airfoil shown and described in my said application Ser. No. 121,101 (United States Letters Patent No. 2,167,601), and the lower surface of the aileron to the rear of its forward convex vane or blade portion 62 is formed with a long sweeping curve 67 slightly concave from the bottom up as in the case of the flap in the said application, with advantageous results in diminished drag when in neutral position and increased lift when in lower position. This advantageous lower curvature of the aileron hereof is not essential to this invention and although preferred should not be interpreted as limitative, any suitable desired under profile of the aileron being well within the intent of this invention.

As shown in the drawings the aileron occupies about one half of the chordwise extent of the wing tip. This proportion is in substantial accord with that of the wing tips heretofore referred to as employed in the tests from which the subsequent data as to performance and operation of this invention were obtained. This proportion, however, and the showing thereof should not be considered limitative. Good results were obtained in testing apparatus embodying this invention in which the aileron only extended for 30% of the chord of the wing tip and these tests indicated that the aileron might be greater than 50% or less than 30% of the chord of the wing tip if desired. This permissive range in chordwise dimension of the ailerons and in the consequent optional mounting of the aileron shafts 64, 64' is well adapted for securing dynamic balance; for by locating the shafts at a proper distance back of the leading edge the effort required by the pilot for moving the ailerons can be varied and left well within practical and desirable limits.

A definite structural advantage however results from pivoting the ailerons substantially midway of the chord, i. e., substantially at the neutral axes of the wing tips, in that there is thus a reduction of the general torsion load stresses of the entire airfoil. By thus applying the forces obtained from the wing tip at about the neutral axis of the entire airfoil, the force is transmitted to the airplane in a general bending load through the airfoil spars instead of as a torsional or twisting load on the rear spars alone, as is ordinarily the case with conventional ailerons hinged at the rear of the airfoil. A great advantage of this change of pivotal or hinged mounting of the aileron in the applied loads of the airfoil as a whole is that it permits adequate rigidity and therefore less tendency of the wing to flutter with a lighter airfoil construction which in turn is reflected by a saving of weight of the entire airfoil structure with a consequent increase in the useful load the airplane can carry.

The short wide pivoted aileron hereof also lends itself well to proper mass balance required of movable surfaces of airplanes designed for high speeds, in order to prevent excessive oscillation, vibration and flutter set up by the turbulent airflow which causes pressure fluctuations.

Reference has heretofore been made to the fact that the wing tips 25 might be mounted at an angle to the airfoil 20 as set forth in said United States Letters Patent No. 2,125,738. That patent embraces not only the angular setting of the wing tips just referred to but also an arrangement of the passageways at an angle to the longitudinal axis of the airfoil in the plane of the wing tip itself. The same consideration of such angular positioning of the passageways is characteristic of the present invention here, as in said United States Letters Patent No. 2,125,738. Theoretically the passageways should be at right angles to the path of the air flowing therethrough, variable within certain limits dependent upon speed, angle of mounting, form and camber of the airfoil and the wing tip, and other factors well known to those skilled in the art. The designer and constructor in building wing tips embodying this invention must take these conditions under consideration in determining the most efficient angle at which to place the passageways, said angle not necessarily being uniform for all of the passageways in each wing tip.

In said United States Letters Patent No. 2,125,738, wherein the passageways were illustrated as chordwise, it was stated that the term "substantially chordwise" was employed as intended to define the direction in which the passageways are placed to meet the varying conditions therein and hereinabove set forth, wherein differing angles from the longitudinal axis of the airfoil may be indicated for efficient operation. As shown in Figs. 1 to 8, inclusive, hereof the passageways lie spanwise respecting the airfoil, which disposition of the passageways characterized the wing tips from the tests of which the data hereinafter set forth was obtained. In view of the foregoing, it will be understood that such showing is purely illustrative and is not intended to constitute a limitation on the invention. In fact, in Fig. 8a there is illustrated an embodiment of the invention hereof in which the pasagewasys are substantially chordwise.

*Means for operating the ailerons and controlling the opening and closing of the passageways*

It is the intent and purpose of this invention that there be provided means for manual movement of the ailerons about axes substantially transverse to the line of flight to positions above and below the normal planes of their respective wing tips whereby the ailerons may be moved to different angles relatively to the airfoil and to each other so as to present to the airstream different angles of incidence, and also means for simultaneously imparting such movement to the ailerons. It is preferred that differential operation of the ailerons be provided for as is now common practice whereby the angular movement upward from neutral position, Fig. 2, be greater and increase more rapidly than the angular movement from neutral position downward. It is also preferred that the means for opening and closing the passageways be so interconnected with the aileron operating means that both may be governed by a single controlling element, such, for example, as a "stick" or lever.

In carrying out the foregoing intent and purpose of this invention I have illustrated apparatus by which in the neutral position of the parts illustrated in Fig. 2 with both passageways closed, the vane or blade 42 and the movable vane or blade section 44 of the forward and rearward passageways respectively, are biased in closed positions; and in passing from closed position, Fig. 2, to open position of maximum lift and minimum drag, Fig. 3, the vane or blade 42 and movable vane or blade section 44 are opened against the said bias by a predetermined differential of air pressure above and below the wing tip; and from this position of maximum lift and minimum drag, Fig. 3, to neutral position, Fig. 2, the vane or blade 42 and the movable vane or blade section 44 are closed by said biasing means on the lowering of said differential of air pressure below the predetermined differential required to open the vane or blade 42 and the movable vane or blade section 44. Furthermore means are provided for preventing the vane or blade 42 and the movable vane or blade section 44 from opening beyond the position of maximum lift and minimum drag, Fig. 3, during this cycle of operation in the event that the said differential of air pressure increases beyond that required for said opening of the passageways.

In further carrying out the foregoing intent and purpose of this invention I have illustrated means for positively moving the vane or blade 42 of the forward passageway from its closed position, Fig. 2, to its position of minimum lift and maximum drag, Fig. 4, and for positively moving the vane or blade section 44 of the rearward passageway from its closed position, Fig. 2, in continued contact with the aileron 37 for maintaining closure of the rearward passageway 39 during the said opening of the forward passageway; said means being such that in passing from this position of minimum lift and maximum drag, Fig. 4, to neutral position, Fig. 2, the aforesaid biasing means move the vane or blade 42 to closed position and maintain the movable vane or blade section 44 in continued contact with the aileron 37 with consequent maintenance of closure of the rearward passageway, the aforesaid differential of air pressure being below that required for opening the passageways. Furthermore the construction and action of the apparatus illustrated is such that during this cycle of operation the aforesaid means for preventing opening of the vane or blade 42 and the movable vane or blade section 44 beyond the position of maximum lift and minimum drag are rendered inoperative and on completion of the cycle are operatively restored.

Mechanism for operating the ailerons and for controlling the opening and closing of the passageways as just set forth may obviously take many forms and that herein shown should be understood as purely illustrative, and not limitative on the scope of this invention.

The mechanism for operating the ailerons herein illustrated is common in the art and need only be briefly described. On or near the inner ends of the aileron supporting shafts 64, 64' are fixedly mounted bell cranks 68, 68' respectively. These in neutral position may extend forwardly in chordwise direction. Links 69, 69' pivotally mounted on the outer ends of the bell cranks 68, 68' respectively, extend downwardly and are in turn pivotally mounted on the ends of a V-shaped rocking beam 70. The rocking beam is fixedly mounted at its point on or near one end of a rock shaft 71 rotatably carried by journal boxes 72, 72' suitably attached to the framework of the fuselage or cockpit. On the other end of the rock shaft 71 is mounted a controlling lever or "stick" 73 customarily vertical in neutral position. Suitable stops 74, 74' are provided for engagement with the rocking beam 70 to limit its movement and the entailed movement of the ailerons. The arms of the rocking beam 70 extend in their upper respective quadrants so that differential rotation of the shafts 64, 64' and ailerons 37, 37' is provided for. For example, as viewed from Fig. 8, movement of the controlling lever 73 to the right rotates the right hand arm of the rocking beam downwardly toward the radius perpendicular with the link 69' and the left hand arm of the rocking beam upwardly toward the radius parallel with the link 69. Hence the downward movement of the link 69' and bell crank 68' is much greater than is the upward movement of the link 69 and bell crank 68. The reverse is true on movement of the controlling lever 73 to the left. The differential movement of the ailerons is seen more graphically on comparison of their positions in Figs. 3 and 4. The extent of the differential movement, as is well known, depends on the angular relation of the two arms of the rocking beam 70 and can be predetermined as desired accordingly.

The controlling means for opening and closing the passageways individual to each wing tip are identical so that, as in the case of the wing tip as a whole, the description will be limited to that of the left wing tip with the understanding that a prime will be added to the reference numerals for the corresponding parts of the right wing tip.

The said controlling mechanism herein illustrated embraces a rod 75 which extends through the body portion 36 of the wing tip from front to back thereof in chordwise direction, the vane or blade 52 at the front of the body portion and the lower section 56 of the vane or blade at the rear thereof being suitably apertured for this purpose as at 76, 77 respectively, bearings 79 suitably attached to the inner framework of the body portion 36 are provided for supporting the rod 75, the support of the rod by the bearings 79 being such as to permit endwise but not rotary movement of the rod.

A vertical cross-member 82 is suitably secured to the rear end of the rod 75, which cross-member has an elongated slot 83 extending through it from side to side. The rod 75 is positioned in a plane below the plane of the aileron shaft 64 and is preferably at right angles to that shaft, and in neutral position, Fig. 2, the vertical cross-member is positioned a suitable distance in front of the shaft. The rearward vane or blade 62 (at the front of the aileron) is suitably apertured as at 84 to permit the cross-member 82 to extend therethrough in its cycle of movement now to be described. A crank-arm 85 is rigidly attached on the aileron shaft 64 and at its end is mounted a pin 86. Positional mounting and arrangement of the crank-arm 85 and pin 86 are such that the pin 86 extends through the slot 83 in cross-member 82, and throughout the permissive rotation of the aileron shaft 64 (and of the aileron, which is rigidly attached thereto) the pin 86 has free vertical movement in the slot. The portion of the slot extending upward from the pin 86 in neutral position of the parts, Fig. 2 comprises the arc of a circle struck from the center of the shaft 64. The portion of the slot extending downward from the pin 86 in neutral position, Fig. 2, may conveniently be in a vertical straight line. Furthermore the angular mounting of the crank-arm 85 on the aileron shaft 64 is such that in the neutral postion of the parts, Fig. 2, the crank-arm 85 extends downwardly at an angle to the rod 75 with the pin 86 in the lower quadrant of its circle adjacent to slot 83. Rotation of the shaft 64 clockwise (as viewed in Figs. 2, 3 and 4) and of the aileron from neutral position, Fig. 2, to its lowest position, Fig. 3, with consequent movement of the crank-arm 85 and its pin 86 upwardly in said quadrant toward the radius parallel with the rod 75 produces no endwise movement of the rod whatsoever. This stationary position of the rod 75 is obviously characteristic for all movements of the aileron within its lower cycle. On the contrary counter-clockwise rotation of the shaft 64 to move the aileron from neutral position, Fig. 2, to its highest position, Fig. 4, with consequent movement of the crank-arm 85 and its pin 86 downwardly in said quadrant toward the radius perpendicular with the rod 75 produces maximum rearward motion of the rod 75. On return of the aileron from its highest position, Fig. 4, to neutral postion, Fig. 2, the rod 75 is moved forwardly to its neutral position. This movement of the rod is obviously characteristic for all movements of the aileron within its upper cycle.

The front end of the rod 75 extends through a vertical slot 90 in the forward vane or blade 42 of the forward passageway 38 and terminates in a threaded portion in front of the vane or blade 42 on to which is screwed an adjusting nut 91 and a lock-nut 92. The slot 90 is of such length (see Fig. 5) as to provide for the vertical movement of the vane or blade 42 in respect to the rod 75 which is necessary to permit of the partial rotation of the vane or blade about the pivot 48 in its complete range of movement from neutral position, Fig. 2, to its position of maximum opening, Fig. 4, and back to neutral position. The adjustment with the nut 91 is such that in neutral position of the parts, Fig. 2, with the vane or blade 42 in closed position the nut 91 is locked into engagement with the forward surface of the vane or blade 42, a suitably curved washer 93 being interposed between the nut 91 and the vane or blade 42, if desired. Where the structure of the nosepiece is such as otherwise to interfere with the proper placing and forward movement of the front end of the rod 75 and the said nuts and washer, it may be cut away as at 94.

The means for biasing the forward vane or blade 42 of the forward passageway 38 in and toward closed position are illustrated as a helical spring 96 mounted on and surrounding the rod 75 and maintained in contact with the rear face of the vane or blade by an adjusting nut 97 and a lock-nut 98 screwed on to a threaded portion of the rod 75. If desired a suitable washer or bearing surface 99 may be interposed between the forward end of the spring and the vane or blade, and a washer 100 between the rearward end of the spring and the adjusting nut.

The movable section 44 of the forward vane or blade of the rearward passageway 39 has extending downwardly from its forward end a solidly attached rigid arm 106 which is bifurcated vertically at its lower end as at 107 to permit the rod 75 to pass therethrough. The bifurcation 107 is of such length as to provide for the vertical movement of the vane or blade section 44 and its arm 106 in respect to the rod 75 which is necessary to permit of the partial rotation of the vane or blade section 44 about the pivot 58 in its complete range of movement from neutral position, Fig. 2, to its uppermost position, Fig. 4, and back to neutral position.

The means for biasing the movable vane or blade section 44 of the rearward passageway 39 in and toward closed position are illustrated as identical with the aforesaid biasing means for the forward vane or blade 42 of the forward passageway 38. A helical spring 116 is mounted on and surrounds the rod 75 and is maintained in contact with the rear face of the bifurcated end 107 of the arm 106 by an adjusting nut 117 and a lock-nut 118 screwed on to a threaded portion of the rod 75. If desired a washer 119 may be interposed between the forward end of the spring and the bifurcated end 107 of the arm 106 and a washer 120 between the rearward end of the spring and the adjusting nut.

As illustrated, on maximum upward movement of the aileron 37 from neutral position, Fig. 2, to the position of Fig. 4, with consequent maximum rearward movement of the rod 75, the forward vane or blade 42 of the forward passageway 38 is positively moved by the curved washer 93 on the rod through a greater arc than is the vane or blade section 44 of the rearward passageway 39 in maintaining contact with its cooperating vane or blade 62 and with the top of the aileron. Throughout the movement of the aileron in its upper cycle, Fig. 2 to Fig. 4 and return, the movable vane or blade section 44 is maintained in contact with the rearward vane or blade 62 by the spring 116, and it is the vane or blade 62 and the top of the aileron which positively move the vane or blade section 44 upwardly during this cycle. It is obvious that provision against objectional frictional wear between the movable vane or blade section 44 and its cooperating vane or blade 62 and the top of the aileron is well within the skill of the art, as, for example, by the provision of roller bearings (not shown) or an abrasion resisting metal contact strip 125.

Many factors are to be taken into consideration in determining the adjustment of the springs 96 and 116, the type of airfoil employed, the character and intended use of the airplane, the preferred sensitivity of the lateral control means, etc. The following illustration should serve as ample instruction for those skilled in the art. With the solid type of airfoil herein shown on a high speed airplane in level flight, to prevent climb of the airplane it is in many instances necessary to fly the airplane at low angles of attack, a small relative lift from the airfoil being sufficient to maintain the level altitude of the airplane. Where such is a major consideration, it is not the desire to increase the relative lift of the wing tips at low angles of attack beyond that of the airfoil. The differential of air pressure above and below the forward passageway 38 and the rearward passageway 39 at low angles of attack below the stalling angle of the airfoil is therefore a major factor in determining the adjustment of the springs 96 and 116 and would indicate an adjustment which would maintain the passageways closed up to the point thus predetermined below the stalling angle of the airplane. On the other hand even at high speeds in level flight quick right and left turns must be provided for, and on substantial lowering of an aileron to secure elevation of that side of the airfoil to which it is attached, the adjustment of the springs should be such as to assure the opening of the passageways in the wing tip on that side of the airfoil to the position of maximum lift and minimum drag, Fig. 3. Under the conditions assumed with the two considerations above set forth controlling, a suitable compromise adjustment of the springs may readily be made.

The means to be provided for preventing the vane or blade 42 of the forward passageway 38 and the movable vane or blade section 44 of the rearward passageway 39 from opening beyond the position of maximum lift and minimum drag, Fig. 3, during the movement of the aileron in the cycle from neutral position, Fig. 2, to lowest position, Fig. 3, and return, in the event that the differential of air pressure above and below the wing tip increases beyond that required for opening the passageways to the position of maximum lift and minimum drag, may take various forms. Preferably said means are under the control of the rod 75, as that rod also forms a convenient instrumentality for rendering inoperative the said means during the movement of the aileron in its upper cycle, Fig. 2 to Fig. 4 and return, and for restoring the said means to operating condition on the return of the aileron to its neutral position, Fig. 2.

The mechanism illustrated is identical for both wing tips, and the description will be limited to that of the left wing tip, with the understanding that a prime will be added to the reference numerals for the corresponding parts of the right wing tip.

As illustrated the springs 96 and 116 are shown completely compressed with their respective coils in contact in the lowest position of the aileron, Fig. 3, with both passageways open to their position of maximum lift and minimum drag. In this position of the parts in the event of an increase of said differential pressure beyond that required to open the passageways to their position of maximum lift and minimum drag, no further opening movement of the vanes or blades 42 and vane or blade section 44 is effected; rearward movement of the rod 75 and of the adjusting nuts 97 and 117 being positively prevented by engagement of the forward edge of the slot 83 with the pin 86. On the return movement of the aileron from its lowest position, Fig. 3, to neutral position, Fig. 2, the rod 75 and the adjusting nuts 97 and 117 remain in their blocking position. As this is true for all positions of the aileron in its cycle of movement from neutral position, Fig. 2, to lowest position, Fig. 3, and return, through said cycle complete compression of the springs effectively prevents opening of the passageways beyond their position of maximum lift and minimum drag.

On the other hand during the movement of the aileron in its cycle from neutral position, Fig. 2, to its highest position, Fig. 4, and return, because of the co-action of the pin 86 and slot 83 the rod 75 and the adjusting nuts 97 and 117 are moved to the rear, with consequent rearward movement of the front ends of the springs 96 and 116 when completely compressed. This is characteristic of the parts until the aileron resumes neutral position, Fig. 2.

Thus the means for preventing movement of the forward vane or blade 42 and the movable vane or blade section 44 beyond their respective positions of maximum lift and minimum drag during the cycle of aileron movement from its neutral position, Fig. 2, to its lowest position, Fig. 3, and return, are rendered inoperative during the cycle of aileron movement from its neutral position, Fig. 2, to its highest position, Fig. 4, and return, and are restored to operative condition on restoration of the aileron to neutral position, Fig. 2.

*Operation*

The operation of the wing tip parts from the standpoint of mere movement of the vanes or blades 42, 42' of the forward passageways 38, 38', the vane or blade sections 44, 44' of the rearward passageways 39, 39', and the ailerons 37, 37', from neutral position, Fig. 2, to their respective positions for effecting an increased lift at one end of the airfoil, Fig. 3, and a decreased lift on the other end thereof, Fig. 4, and back to neutral position, Fig. 2, has been set forth in the above description of the construction of the parts as an aid in understanding the construction and as a more or less determining factor in the form said construction should take. Reference should, therefore, be made to the foregoing for said mechanical details of operation.

In *general summary of the movement of the parts*, with the parts in neutral position, Fig. 2, a manual movement of the controlling lever or stick 73 to the right as shown in Fig. 8, lowers the aileron 37 of the left hand wing tip 25 and on the resulting differential of pressure above and below the passageways 38 and 39 rising above the predetermined pressure differential at which the compression of springs 96 and 116 are set to maintain closure, the forward and rearward passageways will both open (e. g., as in Fig. 3), and will assume the character of passageways heretofore set forth as of the turbine type. In lowered position of the aileron the opening of the passageways thus effected is limited, so that the passageways continue to be of the turbine type for all differentials of pressure above and below the left wing tip 25 higher than the said predetermined pressure differential throughout the time that the controlling lever or stick 73 is in its quadrant to the right of its neutral position and the aileron 37 accordingly lowered.

At the same time the aileron 37' of the right wing tip 25' is raised and with the raising thereof to a substantial degree the vane or blade 42'of the forward passageway 38' is positively moved to such wide open position (e. g., as in Fig. 4), that the forward passageway 38' loses all its lift and the lift of the right wing tip 25' is materially decreased and the drag materially increased. The rearward vane or blade section 44' on the contrary is positively maintained in closed position so as not to lessen the turbulent condition of drag set up along the upper surface of the wing tip 25' and its aileron 37'. These conditions are characteristic of the right wing tip 25' throughout the time that the controlling lever or stick 73 is in its quadrant to the right of its neutral position and the aileron 37' accordingly raised.

In moving the controlling lever or stick 73 from neutral position to the right and return, the left hand aileron 37 is moved through a lesser arc than is the right hand aileron 37', by reason of the angular construction and positioning of the rocking beam 70—this according to common practice.

The reverse of the foregoing positioning of the parts will obviously occur when the controlling lever or stick 73 is moved from neutral position through its left hand quadrant.

Before proceeding with a description of the operation of the lateral control means hereinabove set forth in the control of an airplane about its longitudinal axis a brief preliminary discussion of the forces involved in lateral control and of their effect upon the airplane beyond the stalling angle of its airfoil is essential.

*Lateral control forces.*—The primary forces affecting the lateral control of an airplane are its rolling forces and its yawing forces, roll being the angular displacement about an axis parallel to the longitudinal axis of the airplane and yaw being the angular displacement about an axis parallel to the normal axis of the airplane. Other forces are present but in minor degree.

The measure of the forces of roll and yaw are ordinarily expressed in roll coefficients and yaw coefficients which are conveniently plotted against angles of attack. The curves in each case are a measure of the respective roll and yaw forces resulting from the combined action of the lateral control means at or near both ends of the airfoil, commonly ailerons, the airfoil itself and the airflow which is utilized and modified by the said lateral control means and the airfoil. Note Figs. 9 and 10 respectively.

Yaw may be either favorable or adverse. It is favorable when in the direction toward which it is desired to turn the airplane, and adverse when in the direction away from that toward which it is desired to turn the airplane. Note the zero (0) yaw coefficient line in Fig. 10, in which favorable yawing forces are given negative coefficients and adverse yawing forces positive coefficients.

Curves of the roll coefficients plotted against angles of attack and of the yaw coefficients likewise plotted against angles of attack do not, however, give sufficient data from which to determine to what extent the lateral control means from which the curves are made up are effective in the lateral control of the airplane. It is essential to determine the relation between the rolling force of the lateral control means and the combined lift of the airfoil and lateral control means at both ends thereof. This relation is commonly expressed as a ratio obtained by dividing the roll coefficient by the lift coefficient and is termed "rolling criterion". The rolling criterion is likewise conveniently plotted against angles of attack, see Fig. 12. The rolling criterion which at the time of filing this application is generally accepted as adequate for the lateral control of an airplane is .035 and is so indicated in Fig. 12. The rolling criterion does not take into consideration the forces of yaw.

Polar curves, Fig. 11, have been devised in which the rolling and yawing forces are combined. In the chart, Fig. 11, the coefficients of roll are shown as abscissae and the coefficients of yaw, as ordinates. A dash line extends vertically through the chart which has an arbitrary roll value of .055 and divides the region of adequate roll from the region of inadequate roll, adequate roll increasing progressively from the said line to the right thereof and inadequate roll increasing progressively from the said line to the left thereof. Favorable yawing forces (with minus coefficients) are plotted below the zero yaw coefficient line, and adverse yawing forces (with plus coefficients) above the said zero yaw coefficient line. The angles of attack are indicated on the curves themselves. It is the polar curves which give a complete picture of the combined rolling and yawing forces resulting from the coordinated action of the lateral control means at or near both ends of the airfoil, the airfoil and the airflow modified and utilized by the said lateral control means and the airfoil.

Throughout the tests from which the curves of Figs. 9 to 12 are computed the ailerons were in their extreme lower and upper positions. Arbitrarily no data is presented beyond a 24° angle of attack, this being deemed ample to illustrate fully the principles and operation herein involved.

*Aileron action.*—Approaching the problem of lateral control from the type of airfoil and aileron construction now commonly employed, which as above explained was used in the comparative wind tunnel tests heretofore set forth, the rolling and yawing forces affecting the lateral control of an airplane are primarily the result of aileron action. The lowering of the aileron on one end of the airfoil increases the effective angle of attack of the airfoil for the entire spanwise length of that aileron. Up to approximately the stalling angle the lift of that portion of the airfoil with the aileron lowered is increased and the differential of pressures above and below the airfoil is increased. At the other end of the airfoil with the aileron raised the lift is decreased. A condition of turbulence is set up above the aileron and the adjoining portion of the airfoil and the differential of pressures above and below the airfoil is lessened. This change in airflow and pressure at the ailerons modifies the airflow about the entire airfoil. The result of all of these contributing elements is the setting up of a rolling force which tends to cause the plane to roll about its longitudinal axis upwardly from the lowered aileron and downwardly from the raised aileron.

Lowering the aileron also increases the drag on the end of the airfoil where the aileron is lowered. Raising the aileron on the other end of the airfoil if increasing the drag at all on the end of the airfoil where the aileron is raised does so in much less degree than does the lowered aileron at the opposite end of the airfoil. This results in creating a yawing force which (assuming it is the desire to turn the plane in the direction of the raised aileron) tends to create an adverse yaw. The yawing force thus created further tends to make the end of the airfoil with the lowered aileron travel more slowly than the end with the raised aileron which thus sets up a rolling force of opposite direction and effect from the rolling force originally created by the deflection of the ailerons now under consideration. The present practice is to balance out and overcome this adverse yaw by rudder action, but the resultant increase of parasitic resistance retards the plane and materially reduces the lift of the airfoil.

The increase in the effective angle of attack on the side of the airfoil on which the aileron is lowered is disastrous when that angle of attack becomes to any marked degree greater than the stalling angle of the air-foil. The effective angle of attack at the opposite end of the airfoil is reduced by the raising of its aileron. The result is that the side of the airfoil with the lowered aileron having been raised above its stalling angle, stalls and drops downward instead of rolling up as desired. The airplane then tends to roll about its longitudinal axis in exactly the opposite direction desired. The adverse yawing force is increased and contributes to this action. The airplane then falls away from its original flight path and tends to rotate or spin about the side of the airfoil which is stalled. The lateral control of the airplane by the ailerons is lost. These conditions are obviously aggravated by the presence of gusts when the airplane is attempting to land.

The foregoing aileron acting is graphically presented in Figs. 9 to 12 inclusive, in the curves identified by small circles.

Figure 9:
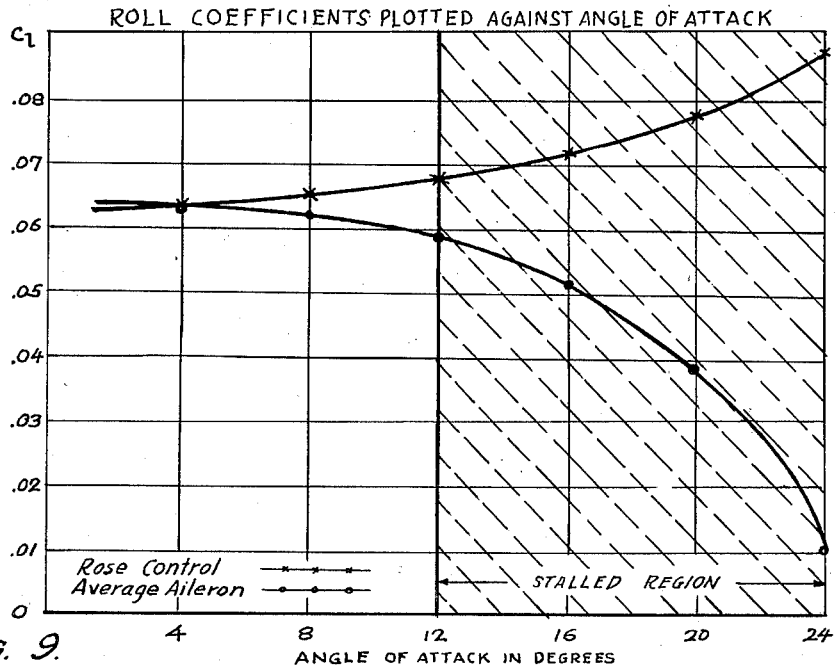
Fig. 9 is a chart showing rolling coefficient curves of an airfoil equipped with control means made in accordance with this invention and of a similar airfoil equipped with an average aileron of equivalent area, the curves being plotted against angle of attack.

In Fig. 9 the roll coefficient of the solid airfoil with the ordinary ailerons is approximately .064 at a plus 4° angle of attack. The roll coefficients gradually decrease until at 12°, the stalling angle of the airfoil, they drop to approximately .059. From the 12° stalling angle of attack the drop is more abrupt until at a 24° angle of attack the roll coefficient is only about .01.

Figure 10:
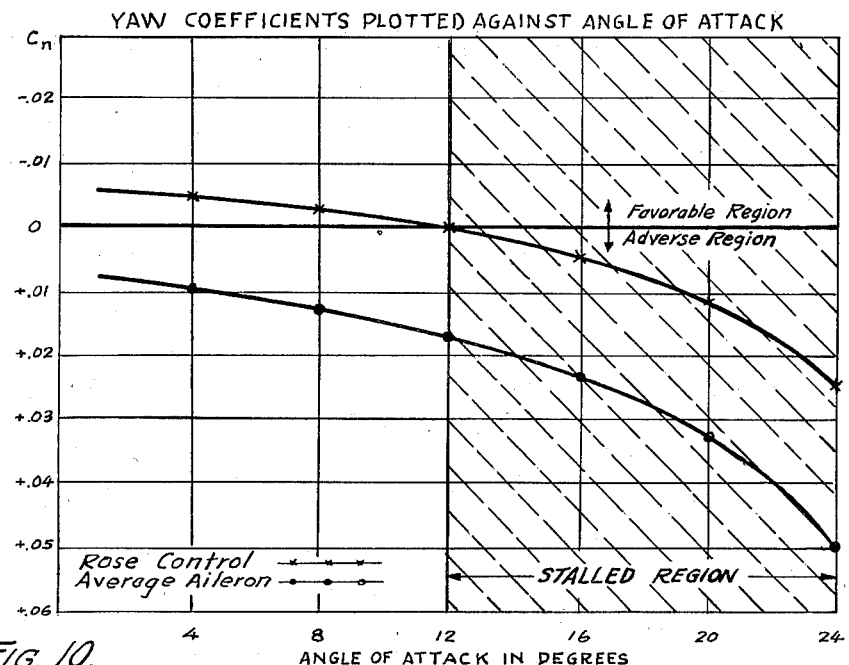
Fig. 10 is a chart showing yawing coefficient curves of an airfoil equipped with control means made in accordance with this invention and of a similar airfoil equipped with an average aileron of equivalent area, the curves being plotted against angle of attack.

Coincident with this drop in the roll coefficients of the solid airfoil with the ordinary ailerons, there is as shown in Fig. 10 a continuous increase in adverse yaw. At a plus 4° angle of attack the yawing force is adverse, its yaw coefficient being approximately .01 and this adverse yaw gradually increases up to 0.18 at the stalling angle of 12°, with a subsequent increase during the stalling region up to about .05 at a 24° angle of attack.

Looking now to the rolling criterion of the solid airfoil with the ordinary ailerons, as shown in Fig. 12 the rolling criterion line slopes downwardly from about .04 at a 4° angle of attack and cuts through the line of adequate control at .035, at an 8° angle of attack. At the 12° stalling angle of attack the rolling criterion is only .03 and it continues to drop to about .01 at the 24° angle of attack. Thus even before the stalling angle is reached the rolling criterion has dropped below the value of adequate control.

The polar curve of the solid airfoil with the ordinary ailerons, Fig. 11, (in which both the rolling and yawing forces are combined) is perhaps the most illuminating. It will first be noted that the curve is entirely in the region of adverse yaw, starting at a 4° angle of attack with an adverse yaw coefficient of about .01 and ending at a 24° angle of attack with an adverse yaw coefficient of about .05. At the 4° angle of attack the roll coefficient of the curve is approximately .064. This decreases continuously until at the vertical line of adequate value the roll coefficient is about .055. At the 24° angle of attack the roll coefficient is only about .01. An adequate roll is maintained until the airfoil reaches an angle of attack of slightly less than 14°, and from that point on the curve passes into the region of inadequate roll with the airplane out of control by aileron action.

*Wing tip action.*—The lateral control means hereof have in common with the ordinary aileron control the coordinated action of the wing tip ailerons, the airfoil and the airflow which is utilized and modified by the airfoil and the wing tip ailerons in the control of the airplane about its longitudinal axis; the lowering of the aileron of the wing tip on one side of the airfoil for raising that side of the airfoil and the simultaneous raising of the aileron of the wing tip on the opposite side of the airfoil for lowering that side of the airfoil; the increase of lift and drag, and the increase in the effective angle of attack on the side of the airfoil with the lowered aileron; and the decrease of lift on the side of the airfoil with the raised aileron.

The ordinary aileron action, however, is greatly modified both by the structural features of the wing tips and by the action of the diverted airflow in the controlled opening and closing of the passageways. The mounting of the wing tips at the extreme ends of the airfoil by the lengthening of the rolling and yawing force lever arms over the length of the corresponding lever arms of ordinary ailerons is a material consideration in increasing the roll and yaw moments of the wing tip forces about their respective axes. The broad chordwise depth of the ailerons with their pivotal mounting preferably at about midway of the chordwise dimension of the airfoil relieves the airfoil of the torsional stress of the ordinary ailerons. The extension of the nosepiece at its rear below the lower surface of the body portion of the wing tip with the induced eddy currents therebeneath and the concave under surface of the ailerons both contribute to a lessened drag of the wing tips. These several structural features combine to render the wing tips far more sensitive and effective in the lateral control of the airplane than is the ordinary aileron structure. This, however, it is believed will be readily understood from the operative details included in the description of the structure and from the general summary of the movement of the parts hereinabove set forth. For that reason the description of the operation of the lateral control means hereof in their control of the airplane about its longitudinal axis will be limited to the combined action of the ailerons, passageways, airfoil and the airflow as utilized and modified by these elements.

Lowering the aileron of the wing tip on one side of the airfoil with the consequent increase in the effective angle of attack is accompanied by the opening of the passageways of that wing tip to the extent that they become passageways of the turbine type. The diverted airflow passing therethrough in increasing the lift of the wing tip not only augments the favorable rolling action of the lowered aileron but by its jet action at the top of the passageways in decreasing the drag of the wing tip cuts down the adverse yawing force.

Raising the aileron of the wing tip on the other side of the airfoil opens the forward passageway to such extent that it operates as a free passageway for air from the bottom of the airfoil to the top thereof. The diverted airflow passing therethrough in decreasing the lift of the wing tip augments the favorable rolling action of the raised aileron by increasing air pressure against the top of the raised aileron and thus depressing it and also increasing its drag.

The individual action of the wing tips at each end of the airfoil in modifying and diverting the air-stream beneath the airfoil is reflected throughout the lateral control means as a whole. This is particularly apparent in the case of the yaw forces. Up to approximately the stalling angle the favorable yawing forces developed in the wing tip with a raised aileron result in a favorable yawing moment created at the normal axis of the airplane which is greater than the adverse yawing moment created by the adverse yawing forces of the wing tip with the lowered aileron at the opposite end of the airfoil. Up to approximately the stalling angle this favorable yawing moment counterbalances the adverse yawing moment and both yawing and rolling forces are favorable to lateral control.

Beyond approximately the stalling angle the gradually increased lift of the wing tip with its lowered aileron coacting along the airfoil with the increased drag of the wing tip with the raised aileron results in a continuously increasing rolling moment of such magnitude that when the combined yawing forces at approximately the stalling angle change from favorable to adverse and thereafter increase adversely their unfavorable effect is overcome, and lateral control is maintained beyond the stalling angle up to and including all angles of attack likely to be encountered by the airplane in flight. So effective are the lateral control means hereof in overcoming adverse yawing forces that for making normal turns rudder action may be eliminated.

The foregoing action of the lateral control means hereof is graphically presented in Figs. 9 to 12 inclusive, in the curves identified by the small crosses.

In Fig. 9 the roll coefficient of the airfoil and wing tips herein specifically illustrated is approximately .064 at a plus 4° angle of attack. The roll coefficient gradually increases until at 12°, the stalling angle of the airfoil, it rises to approximately .068. From the 12° stalling angle of attack the rise continues smoothly until at a 24° angle of attack the roll coefficient is approximately .088. It will be observed that the direction of the roll coefficient curve of the lateral control means hereof is in opposite direction from that of the average aileron, both prior to reaching the stalling angle and above the stalling angle throughout the stalled region plotted.

Coincident with this rise in the roll coefficient of the lateral control means hereof, there is, however, a tendency to yaw which gradually becomes less favorable, as is shown in Fig. 10. At a plus 4° angle of attack the yaw coefficient is approximately a minus .005 and is favorable. The yaw coefficient gradually increases from this minus value to zero at the 12° stalling angle. Up to the stalling angle the yaw coefficients are, therefore, favorable. Above the stalling angle the curve gradually drops until at a 24° angle of attack the yaw coefficient is approximately a plus .025. It is of interest to note that while the slope of the curve for the lateral control means hereof follows quite generally the slope of the line for the average aileron control, the curve of the latter is always in the adverse region, whereas the curve for the lateral control means hereof is in the faborable region up to the 12° stalling angle, and beyond the stalling angle the adverse yawing forces are markedly less than with the average aileron control.

The gradually increasing roll coefficients of the lateral control means hereof as shown in Fig. 9 are, of course, reflected in the rolling criterion curve of the said means plotted in Fig. 12. The rolling criterion curve of the lateral control means hereof is plotted from approximately a 4° angle of attack at which it is about .04. It gradually rises and at the 12° stalling angle has a value of approximately .044 with a rise to .054 at a 24° angle of attack. Throughout it is in the region of adequate value. On the contrary, the rolling criterion of the average aileron control passes below the line of adequate value .035 at an 8° angle of attack and continues adversely from there on with decreasing value.

The polar curve, Fig. 11, is most illuminating in showing the combined action of the wing tips at both ends of the airfoil, the airfoil itself and the airflow modified and utilized by the wing tips and the airfoil in the reaction of the favorable rolling forces with the yawing forces in such a way that an adequate roll is always maintained despite the adverse yawing forces beyond the stalling angle. Starting at a 4° angle of attack with a favorable yaw coefficient of approximately a minus .005 and with a roll coefficient of approximately .064 the polar curve continuously rises in the region of adequate roll until at a 24° angle of attack it has reached a roll value of approximately .088. The effect of the adverse yawing forces is completely overcome and control is maintained throughout. This is in marked contrast to lateral control by the ordinary aileron in which the polar curve passes from the region of adequate roll to inadequate roll at an angle slightly less than a 14° angle of attack.

While it should be understood that the various values determined and plotted in Figs. 9 to 12 are from open throat wind tunnel tests and are based on the testing of specific models, they reflect the operation and performance of full-sized equipment in flight with the degree of accuracy attributable to present-day, carefully conducted wind tunnel tests of airfoil operation generally. It is obvious that these values both for ordinary aileron control and for control by the lateral control means hereof will vary with the apparatus employed and that in fact considerable though unessential variation is to be expected particularly with the modification of the lateral control means of this invention from that specifically shown and described which modification is well within the spirit and intent of the invention as variously pointed out above. The values of Figs. 9 to 12 should, therefore, not be deemed as limitative but rather as illustrative of the operation of this invention.

Furthermore as above pointed out the curves of Figs. 9 to 12 are with the ailerons in their extreme positions. It is believed that to present data taken with the ailerons in all intermediate positions would prolong the description of the operation of this invention to unjustified length. The curves may be taken as generally characteristic of the operation both of solid airfoils equipped with ordinary ailerons and of the lateral control means hereof throughout the various operative positions of their respective ailerons with such modification as will be readily apparent to those skilled in the art.

*Chordwise passageways—Fig. 8a*

Reference has been made in the foregoing to the effect that theoretically the passageways in the wing tip should be at right angles to the path of air flowing therethrough, variably within certain limits dependent on numerous factors well known to those skilled in the art. My United States Letters Patent No. 2,125,738 was referred to in this connection, and it was explained that in carrying out the invention hereof the passageways, as in the case of the said patent, might be "substantially chordwise."

In Fig. 8a is schematically illustrated a wing tip constructed in accordance with the invention hereof in which is shown one form of substantially chordwise passageways, certain parts and reference numerals being omitted for brevity and clearness. As the parts in the structure illustrated correspond with similar parts in Figs. 1 to 8, inclusive, I have employed in Fig. 8a the reference numerals of those figures, with a double prime ('') as a superscript.

The parts in Fig. 8a and their operation so closely follow the corresponding parts and their operation in the structure of Figs. 1 to 8, inclusive, that it is not deemed necessary to present a detailed description thereof. The forward and rearward passageways in the structure of Fig. 8a, and the entire operating mechanism for opening and closing the said passageways, are in themselves identical with the forward and rearward passageways of the structure of Figs. 1 to 8, inclusive and their operating mechanism, except in certain particulars later to be mentioned.

As in the case of the structure of Figs. 1 to 8, inclusive, identical wing tips (except for reversal for parts) are suitably attached one to each end of the airfoil 20. In the case of Fig. 8a it is the wing tip on the right end of the airfoil which, together with a part of the airfoil, is illustrated and to which this brief description will be confined. The airfoil is provided with a flap 30'' identical in structure and operation with the flap 30' of the previous figures, except that at the outer spanwise extremity the flap 30'' is cut away as at 30a to avoid interference with the aileron 37'' when the latter is moved to its lower positions.

The aileron 37'' is illustrated as mounted on a shaft 64'', being rigidly attached thereto, which shaft is journalled in suitable brackets 64a, 64a fixedly attached to the body portion of the wing tip 36'' in well known manner. The shaft 64'' is attached to the end of the shaft 64' by a universal joint 64b, the connection and mounting being such that the shaft 64'' and aileron 37'' are operated from and by the shaft 64' in precisely the same way as are the corresponding parts in the structure of the preceding figures. In Fig. 8a, however, the aileron 37'' is extended forwardly at such an angle from the rearward spanwise extremity of the airfoil 20 that the passageway formed at the front thereof is "substantially chordwise", as above defined, and the shaft 64'' obviously extends forwardly from the universal joint at the same angle.

The inner chordwise edge or face of the aileron 37'' is formed as or with a vane or blade 62'' which corresponds in structure and operation with the vane or blade 62' of the previous figures.

The body portion 36'' of the wing tip is here positioned as a substantially chordwise member extending from its bottom end at the lower outer edge of the airfoil 20 in a forward chordwise direction and terminating in a suitable nosepiece 35'' which is suitably connected with the airfoil nosepiece 35' as an extension thereof. The fixed body portion 36'' is provided at its outer edge or face with a vane or blade formed with two sections, one, section 44'', being movable and the other being fixed as is the forward vane or blade of the rearward passageway in the structure of the previous figures, the movable section 44'' being suitably pivoted at the top to the body portion by a pivot 50''. For the details of this structure see Figs. 2, 3, and 4. The body portion 36'' has its inner edge or face formed as or with a vane or blade which corresponds in structure and operation with the rearward vane or blade 52 of the forward passageway of the previous figures, which see.

The nosepiece 35'' to the left of the body portion 36'' is formed with a rearward extension 35a of suitable upper and lower profile and dimensions. To the left this extension 35a adjoins the end of the airfoil 20, and at the right is provided with a vane or blade 42'' which is suitably pivoted thereto on the top by the pivot 48''. The construction and mounting of this vane or blade 42'' and of the face of the extension 35a at the lower extremity of the vane or blade 42'' are precisely like that of the vane or blade 42' and nosepiece 35' illustrated in Figs. 2, 3, and 4 to which reference is made.

The operating mechanism for the vane or blade 42'' and the movable section of the vane or blade 44'' is precisely like that illustrated in the previous figures of the case, reference being had more particularly to Figs. 2, 3, and 4. Certain parts of this operating mechanism are illustrated in dotted lines in Fig. 8a, the crank arm 85'' rigidly mounted to the shaft 64'', the cam 82'', the operating rod 75'', the rounded faced washers or bearing surfaces 93'' and 99'' on the rod 75'', but for full details of this operating mechanism reference should be made to the previous figures of the case.

It will be understood that the curvature of the various vanes or blades and their operation in accordance with the operation of the corresponding vanes or blades in the preceding figures are such that with the aileron 37'' turned downward in its lower positions, both passageways are opened to constitute "passageways of the turbine type"; and with the aileron 37" raised, the forward passageway is opened for a free passage of air therethrough, the opening preferably being such that the passageway increases in cross-section from inlet to outlet, and the rearward passageway is closed. Further, as the aileron shaft 64" is operatively connected with the shaft 64' on the right side of the airfoil and the corresponding aileron shaft for the aileron on the left side of the airfoil (not shown) is in like manner connected with the shaft 64, it follows that the aileron operation in the structure of Fig. 8a will correspond with that of the structure of the previous figures.

While structurally the axis of the aileron 37" in Fig. 8a is not transverse to the line of flight to the same extent as is the axis of the aileron 37' in Figs. 1 to 8, inclusive, it is well known that in the lateral control of an airplane, the axis of the ailerons may take varied positions in respect to the flight path. Functionally in the lateral control of the airplane the structural difference in axial position of the two shafts 64" and 64' is in itself not substantially material. The foregoing reference, therefore, to the position of the axis or axes of the ailerons of Figs. 1 to 8, inclusive, as transverse to the line of flight, should be broadly construed in accordance with the statement in the early part of this specification as to the positioning of the passageways at right angles to the path of air flowing therethrough, and should not exclude the substantially chordwise positioning of the axis of the aileron 37".

In like manner the same liberality, which is specifically stated in the foregoing description to characterize the structure of Figs. 1 to 8, inclusive, in interpretating the invention thereof, should be applied to the structure of Fig. 8a.

The foregoing detailed description and illustrations have been given for clearness of understanding and no undue limitations should be deduced therefrom, but the appended claims should be construed as broadly as permissible in view of the prior art.

I claim:

1. Lateral control means for an airplane embodying (a) an airfoil, (b) a wing tip at each end thereof, each wing tip comprising a nosepiece, a fixed body portion and an aileron, (c) the nosepiece at the rear thereof and the fixed body portion at the front thereof being provided with curved vanes or blades forming a forward passageway therebetween, the fixed body portion at the rear thereof and the aileron at the front thereof being provided with curved vanes or blades forming a rearward passageway therebetween, the said passageways having their inlet ports at the bottom of the airfoil to the front of their outlet ports at the top of the airfoil, (d) means for opening and closing said passageways, (e) means for simultaneously moving the ailerons about an axis or axes substantially transverse to the line of flight to positions above and below the normal planes of their respective wing tips whereby the ailerons may be moved to different angles relatively to the airfoil and to each other so as to present to the airstream different angles of incidence, (f) the parts being so constructed and arranged that with the aileron of the wing tip on one side of the airfoil in lowered position and the aileron of the wing tip on the other side of the airfoil in raised position the forward and rearward passageways of the wing tip with its aileron lowered are open and comprise passageways of gradually decreasing cross-section from inlet to outlet with their mean cross-sectional line gradually flattening from inlet to outlet, the amount of opening being such that there is no appreciable straight-line path for air from inlet to outlet, and at the wing tip having its aileron raised the forward passageway is open to permit a free flow of pressure air upwardly therethrough and the rear passageway is maintained closed, (g) whereby the correlated action of the two wing tips and the airfoil on the airstream modifies the flow thereof in such way that a predominant rolling force is created which persists and maintains lateral control of the airplane well beyond the stalling angle of the airfoil.

2. Lateral control means as in claim 1, in which the nosepiece of the wing tip is fixed respecting the airfoil.

3. Lateral control means as in claim 1, in which the nosepiece of the wing tip has a rearwardly projecting part extending below the lower surface of the fixed body portion and in which the aileron has its lower surface formed with an upwardly extending concave curvature.

4. Lateral control means as in claim 1, in which the means for opening and closing the passageways of the wing tip comprise a pivotal mounting for one of the vanes or blades of each wing tip passageway.

5. Lateral control means as in claim 1, in which the means for opening and closing the passageways of the wing tip comprise a pivotal mounting at the top of the wing tip for one of the vanes or blades of each wing tip passageway.

6. Lateral control means as in claim 1, in which the nose-piece is fixed respecting the airfoil, in which the forward vane or blade of the rearward wing tip passageway is formed with an upper movable section and a lower fixed section and in which the means for opening and closing the passageways of the wing tip comprise a pivotal mounting for the forward vane or blade of the forward passageway at the top of the nosepiece of the wing tip and a pivotal mounting for the said movable vane or blade section of the rearward passageway at the top of the fixed body portion.

7. Lateral control means as in claim 1, in which the nosepiece of the wing tip is fixed, in which the means for opening and closing the forward wing tip passageway comprise a pivotal mounting for the forward vane or blade thereof at the top of the nosepiece, and in which the nosepiece has a rearwardly projecting part extending below the lower surface of the fixed body portion, the rearwardly projecting part of the nosepiece being so curved that its rear surface forms a continuation of the curvature of the said vane or blade when the said passageway is open in the downward position of its co-operating aileron.

8. Lateral control means as in claim 1, in which the nosepiece of the wing tip is fixed, in which the means for opening and closing the forward wing tip passageway comprise a pivotal mounting for the forward vane or blade thereof at the top of the nosepiece, in which the nosepiece has a rearwardly projecting part extending below the lower surface of the fixed body portion, the rearwardly projecting part of the nosepiece being so curved that its rear surface forms a continuation of the curvature of the said vane or blade when the said passageway is open in the downward position of its cooperating aileron, and in which the forward vane or blade of the forward passageway has a forwardly extending curved plate struck from the axis of its pivotal mounting, which plate forms a sliding contact with the rearwardly projecting lower part of the wing tip nosepiece on rotation of the said vane or blade about its pivotal mounting to positions in which the forward passageway is open to permit free flow of pressure air upwardly therethrough.

9. Lateral control means as in claim 1, in which the forward vane or blade of the rearward passageway of the wing tip is divided into an upper movable section and a lower fixed section, in which the means for opening and closing the rearward passageway of the wing tip comprise a pivotal mounting for the said movable vane or blade section at the top of the fixed body portion of the wing tip, and in which the fixed section of the said forward vane or blade of the rearward passageway has a forwardly extending curved plate struck from the axis of the pivotal mounting of the said movable vane or blade section, with which plate the lower edge of the movable vane or blade section makes a sliding contact on rotation upwardly from neutral position.

10. Lateral control means as in claim 1, in which the nosepiece of the wing tip is fixed, in which the means for opening and closing the forward wing tip passageway comprise a pivotal mounting for the forward vane or blade thereof at the top of the nosepiece, in which the nosepiece has a rearwardly projecting part extending below the lower surface of the fixed body portion, the rearwardly projecting part of the nosepiece being so curved that its rear surface forms a continuation of the curvature of the said vane or blade when the said passageway is open in the downward position of its cooperating aileron, in which the forward vane or blade of the forward passageway has a forwardly extending curved plate struck from the axis of its pivotal mounting, which plate forms a sliding contact with the rearwardly projecting lower part of the wing tip nosepiece on rotation of the said vane or blade about its pivotal mounting to positions in which the forward passageway is open to permit free flow of pressure air upwardly therethrough, in which the forward vane or blade of the rearward passageway of the wing tip is divided into an upper movable section and a lower fixed section, in which the means for opening and closing the rearward passageway of the wing tip comprise a pivotal mounting for the said movable vane or blade section at the top of the fixed body portion of the wing tip, and in which the fixed section of the said forward vane or blade of the rearward passageway has a forwardly extending curved plate struck from the axis of the pivotal mounting of the said movable vane or blade section, with which plate the lower edge of the movable vane or blade section makes a sliding contact on rotation upwardly from neutral position.

11. Lateral control means as in claim 1, in which means are provided for controlling the opening and closing means for the wing tip passageways, which controlling means include mechanism biasing the opening and closing means to closed position.

12. Lateral control means as in claim 1, in which means are provided for controlling the means for opening and closing at least one of the wing tip passageways, which controlling means include one or more springs biasing the opening and closing means to closed position.

13. Lateral control means as in claim 1, in which means are provided for controlling the means for opening and closing at least one of the wing tip passageways, which controlling means include mechanism biasing the said opening and closing means to closed position, said controlling means being adjustable to exert a predetermined pressure on the means for opening and closing the said wing tip passageway, which pressure is determinative of the differential of air pressure above and below the wing tip at which with its aileron lowered the said passageway thereof is opened.

14. Lateral control means as in claim 1, in which means are provided for controlling the means for opening and closing at least one of the wing tip passageways, which controlling means include mechanism biasing the said opening and closing means to closed position, said controlling means being adjustable to exert a predetermined pressure on the said means for opening and closing the said wing tip passageway, which pressure is determinative of the differential of air pressure above and below the wing tip at which with its aileron lowered the said passageway thereof is opened, and in which limiting mechanism is provided for preventing the said passageway of the wing tip with its aileron lowered from being opened to such extent that an appreciable straight line path for air through the said passageway from inlet to outlet thereof is provided.

15. Lateral control means as in claim 1, which means for operating the opening and closing means for the wing tip passageways are provided, which operating means include means for positively opening the forward passageway of the wing tip on one end of the airfoil to such extent as to permit a free flow of pressure air upwardly therethrough and means for maintaining the rearward passageway of said wing tip in closed position, on raising the aileron of said wing tip above its neutral position.

16. Lateral control means as in claim 1, in which means are provided for controlling the means for opening and closing at least one of the wing tip passageways, which controlling means include mechanism biasing the said opening and closing means to closed position, said controlling means being adjustable to exert a predetermined pressure on the said means for opening and closing the said wing tip passageway, which pressure is determinative of the differential of air pressure above and below the wing tip at which with its aileron lowered the said passageway thereof is opened, in which limiting mechanism is provided for preventing the said passageway of the wing tip with its aileron lowered from being opened to such extent that an appreciable straight line path for air through the said passageway from inlet to outlet thereof is provided, and in which means are provided for rendering inoperative the specified limiting mechanism of a wing tip during the raised position of its aileron and for restoring the said limiting mechanism to operative condition on lowering the said aileron to neutral postion.

17. Lateral control means as in claim 1, in which the means for simultaneously imparting the specified movement to the ailerons include a lever so connected with said means as to unify the control thereof in a single instrumentality, and in which means are provided for imparting differential movement to the ailerons of the wing tips on opposite ends of the airfoil.

18. Lateral control means as in claim 1, in which means are provided for operating the opening and closing means for the wing tip passageways, and means for interconnecting said operating means with the specified means for imparting movement to the ailerons.

19. Lateral control means as in claim 1, in which are provided means for operating the opening and closing means for the wing tip passageways, and means including a lever for interconnecting the said operating means with the specified means for imparting movement to the ailerons, the parts being so connected and arranged as to unify the control of the said operating means and the said means for imparting movement to the ailerons into a single instrumentality.

20. In airfoil construction the combination of vanes or blades cooperating to form a passageway through the airfoil from bottom to top; one of said vanes or blades being curved concavely from bottom to top and comprising the forward wall of said passageway and the other of said vanes or blades being curved convexly from bottom to top and comprising the rearward wall of said passageway; the forward vane or blade being divided into an upper movable section and a lower fixed section, the movable vane or blade section being pivotally mounted on a line between the upper and lower edges of the movable vane or blade section and being adapted to close the passageway at the top thereof; the parts being so constructed and arranged that on rotation of the movable vane or blade section from closed position to a predetermined point the movable vane or blade section is in alignment with the fixed vane or blade section and the curvature of the two sections is continuous, and the passageway is open and comprises a passageway of the turbine type with a consequent increased lift and decreased drag of the airfoil.

21. In airfoil construction the combination of vanes or blades cooperating to form a passageway through the airfoil from bottom to top; one of said vanes or blades being curved concavely from bottom to top and comprising the forward wall of said passageway and the other of said vanes or blades being curved convexly from bottom to top and comprising the rearward wall of said passageway; the forward vane or blade being divided into an upper movable section and a lower fixed section, the movable vane or blade section being pivotally mounted on a line between the upper and lower edges of the movable vane or blade section and being adapted to close the passageway at the top thereof; the parts being so constructed and arranged that on rotation of the movable vane or blade section from closed position to a predetermined point the movable vane or blade section is in alignment with the fixed vane or blade section and the curvature of the two sections is continuous, and the passageway is open and comprises a passageway of the turbine type with a consequent increased lift and decreased drag of the airfoil; and on rotation of the movable vane or blade section beyond said predetermined point the cross section of that portion of the passageway bounded and defined by the movable vane or blade section increases from bottom to top thereby permitting a free flow of pressure air upwardly through the passageway with a consequent decreased lift and increased drag of the airfoil.

22. Airfoil construction as in claim 21, in which means are provided for effecting closure between the movable and fixed sections of the forward vane or blade when out of alignment.

23. An airfoil for an airplane provided with an elongated wing tip and embodying in the wing tip a plurality of vanes or blades forming one or more passageways extending through the wing tip from the lower surface to the upper surface thereof, said vanes or blades being formed with cooperating curved surfaces and being so constructed and arranged that the said passageways have their inlet ports at the bottom of the airfoil to the front of their outlet ports at the top of the airfoil in respect to the airflow beneath the wing tips, with the cross-sections of the passageways diminishing gradually from the inlet to the outlet thereof and the mean cross-sectional lines of the passageways gradually flattening from inlet to outlet with no appreciable straight line passage for air through the passageways from inlet to outlet, the passageways being positioned substantially chordwise of the wing tip.

24. In lateral control means for an airplane the combination with an airfoil, a wing tip provided with a forward passageway, a rearward passageway, a movable valve piece associated with each passageway for opening and closing the said passageways and a movable aileron suitably mounted for cooperation with the said passageways, of means for moving the aileron to and from neutral position and for controlling the movement of the said valve pieces to open and closed position; said last named means comprising a shaft on which the aileron is fixedly mounted, a crank-arm fixedly mounted on the aileron shaft, and a pin mounted on said crank-arm; a rod mounted at substantially at 90° angle to the aileron shaft and having lengthwise movement, a piece fixedly mounted on the said rod at the rear thereof provided with a loose-motion slot for operative engagement with the said crank-arm pin; compression coil springs mounted on the said rod one for each valve piece, the rearward end of said springs being adjustably fixed on the said rod and the forward end of said springs forming an operative contact with their respective valve pieces and biasing the valve pieces to closed position, and a connection on the forward end of the rod for moving the valve piece of the forward passageway to open position; the construction and relation of the parts being such that on rotation of the aileron shaft to move the aileron upwardly the valve piece of the forward passageway is raised to open position, and on rotation of the aileron shaft to move the aileron downwardly with consequent increase in the differential of air pressure above and below the airfoil the pressure air beneath the airfoil raises both valve pieces to open position.

25. Lateral control means as in claim 24, in which that portion of the specified loose-motion slot in which the aileron shaft crank-arm pin moves in the cycle of movement of the aileron below neutral position, is struck from the axis of the aileron shaft as a center.

26. Lateral control means as in claim 1, in which the cross-section of the forward passageway of the wing tip with its aileron in raised position increases from inlet to outlet.

27. Lateral control means as in claim 1, in which the outlet port of the forward passageway of the wing tip with its aileron in lowered position is approximately to the rear of the maximum ordinate of the top camber curve of the wing tip, and in which the cross-section of the forward passageway of the wing tip with its aileron in raised position increases from inlet to outlet.

WILLIAM K. ROSE.